United States Patent
Horlock

(10) Patent No.: US 10,038,204 B2
(45) Date of Patent: Jul. 31, 2018

(54) CURRENT COLLECTOR FOR A FUEL CELL

(71) Applicant: Intelligent Energy Limited, Loughborough (GB)

(72) Inventor: Phillip Mark Horlock, Loughborough (GB)

(73) Assignee: Intelligent Energy Limited, Loughborough (GB)

( * ) Notice: Subject to any disclaimer, the term of this patent is extended or adjusted under 35 U.S.C. 154(b) by 54 days.

(21) Appl. No.: 14/435,117

(22) PCT Filed: Oct. 11, 2013

(86) PCT No.: PCT/GB2013/052659
§ 371 (c)(1),
(2) Date: Apr. 10, 2015

(87) PCT Pub. No.: WO2014/060728
PCT Pub. Date: Apr. 24, 2014

(65) Prior Publication Data
US 2015/0255806 A1    Sep. 10, 2015

(30) Foreign Application Priority Data
Oct. 15, 2012    (GB) .................................. 1218426.3

(51) Int. Cl.
*H01M 8/00* (2016.01)
*H01M 8/0202* (2016.01)
(Continued)

(52) U.S. Cl.
CPC ..... *H01M 8/0269* (2013.01); *H01M 8/04067* (2013.01); *H01M 8/04328* (2013.01);
(Continued)

(58) Field of Classification Search
CPC ............... H01M 8/0269; H01M 8/248; H01M 8/04328; H01M 8/04335; H01M 8/04507; H01M 8/045; Y02E 60/50; H01G 11/28
See application file for complete search history.

(56) References Cited

U.S. PATENT DOCUMENTS 6,296,964 B1 * 10/2001 Ren ..................... H01M 8/0254
429/431
6,541,147 B1    4/2003 McClean et al.
(Continued)

FOREIGN PATENT DOCUMENTS

CN    1607689 A    4/2005
CN    2760771 Y    2/2006
(Continued)

OTHER PUBLICATIONS

Great Britain Patent Application No. 1218426.3; Search Report; dated Nov. 21, 2012; 4 pages.
(Continued)

*Primary Examiner* — Nicholas P D'Aniello
*Assistant Examiner* — Abibatu O Ojo-Amoo
(74) *Attorney, Agent, or Firm* — Baker & Hostetler LLP

(57) ABSTRACT

A fuel cell stack assembly has a plurality of cells in a stack configuration. Each cell comprises a membrane-electrode assembly disposed between an anode flow plate and a cathode flow plate. A current collector plate is disposed at each end of the stack and a compression assembly maintains the stack under compression. At least one of the current collector plates is formed as a printed circuit board having a first face disposed against a cathode flow plate or an anode flow plate of an outermost cell in the stack and a second face opposite the first face. The first face includes an electrically conductive layer disposed on a substrate of the printed circuit board to serve as a stack current collector electrode. Electrical components such as temperature sensors can be
(Continued)

mounted on the printed circuit board such that they lie in or adjacent to a flow channel extending along an adjacent face of the anode or cathode flow plate. The printed circuit board can provide laterally extending connection tabs for electrical connection to the current collector electrode and to the electrical components.

14 Claims, 2 Drawing Sheets

(51) Int. Cl.
*H01M 8/0432* (2016.01)
*H01M 8/04007* (2016.01)
*H01M 8/248* (2016.01)
*H01M 8/04492* (2016.01)

(52) U.S. Cl.
CPC ....... *H01M 8/04335* (2013.01); *H01M 8/248* (2013.01); *H01M 8/045* (2013.01); *H01M 8/04507* (2013.01)

(56) References Cited

U.S. PATENT DOCUMENTS

| | | |
|---|---|---|
| 2004/0227518 A1 | 11/2004 | Joos et al. |
| 2005/0202297 A1 | 9/2005 | Schmitz et al. |
| 2006/0105220 A1 | 5/2006 | Shu et al. |
| 2006/0124346 A1 | 6/2006 | Shu et al. |
| 2006/0141326 A1 | 6/2006 | Artibise et al. |
| 2007/0065697 A1 | 3/2007 | Shu et al. |
| 2007/0065698 A1 | 3/2007 | Shu et al. |
| 2007/0138620 A1 | 6/2007 | Shu et al. |
| 2008/0003473 A1* | 1/2008 | Tung ............... H01M 8/0215 429/435 |
| 2008/0107926 A1 | 5/2008 | Yamada et al. |
| 2008/0118783 A1* | 5/2008 | Cetegen ............... G01K 11/003 429/413 |
| 2008/0280183 A1 | 11/2008 | Eun et al. |
| 2011/0217613 A1 | 9/2011 | Rea et al. |

FOREIGN PATENT DOCUMENTS

| | | |
|---|---|---|
| CN | 101038967 A | 9/2007 |
| CN | 101091277 A | 12/2007 |
| CN | 102036473 A | 4/2011 |
| CN | 102064294 A | 5/2011 |
| GB | 2412785 | 10/2005 |
| JP | S63-013276 A | 1/1988 |
| JP | 2002-151136 A | 5/2002 |
| JP | 2005-527944 A | 9/2005 |
| JP | 2005-294256 A | 10/2005 |
| JP | 2005-340166 A | 12/2005 |
| JP | 2007-242339 A | 9/2007 |
| JP | 2008-525975 A | 7/2008 |
| JP | 2010-067429 A | 3/2010 |
| TW | M291090 U | 5/2006 |
| WO | WO 2003/085760 A2 | 10/2003 |
| WO | WO2012/117035 A1 | 9/2012 |

OTHER PUBLICATIONS

International Search Report dated Feb. 3, 2014, issued in International patent application PCT/GB2013/052659.
Singapore Patent Application No. 11201502771S; Written Opinion; dated Dec. 16, 2015; 11 pages.
Bent Sorensen; "Hydrogen Fuel Cells: Emerging technologies and applications"; Elsevier Academic Press; Dec. 2005; p. 177.
"Mark1020 ACS™ Fuel Cell Stack—Product Manual and Integration Guide"; Ballard Power Systems, Inc.; Feb. 2009; 9 pages.
Dianxue Cao; "Fuel Cell System"; Beijing University of Aeronautics and Astronautics Press; Sep. 2009; p. 29-30.
China Patent Application No. 201380053652.5; Third Office Action; dated Mar. 20, 2018; 18 pages.
China PatentApplication No. 2013800536525; Third Office Action; dated Mar. 20, 2018; 18 pages (see p. 6) cite No. 35.

* cited by examiner

CURRENT COLLECTOR FOR A FUEL CELL

CROSS-REFERENCE TO RELATED APPLICATIONS

This patent application is a National Stage of International patent application PCT/GB2013/052659 filed Oct. 11, 2013, which claims priority to Great Britain patent application GB1218426.3 filed Oct. 15, 2012, the disclosures of which are incorporated by reference in their entirety.

The present invention relates to electrical connector systems used in fuel cell stacks to make electrical connections to the fuel cell stack.

Conventional electrochemical fuel cells convert fuel and oxidant into electrical and thermal energy and a reaction product. A typical fuel cell comprises a membrane-electrode assembly (MEA) sandwiched between an anode flow field plate and a cathode flow field plate. Gas diffusion layers may be disposed between each flow field plate and the MEA to better distribute the fuel and oxidant to the MEA. Gaskets may be used to separate various layers and to provide requisite seals. The flow field plates typically include one or more channels extending over the surface of the plate adjacent to the MEA for delivery of fluid fuel or oxidant to the active surface of the MEA.

In a conventional fuel cell stack, a plurality of cells are stacked together, so that the anode flow field plate of one cell is adjacent to the cathode flow field plate of the next cell in the stack, and so on. In some arrangements, bipolar flow plates are used so that a single flow field plate has fluid flow channels in both sides of the plate. One side of the bipolar plate serves as an anode flow plate for a first cell and the other side of the flow plate serves as a cathode flow plate for the adjacent cell. Power can be extracted from the stack by electrical connections made to the first and last flow plate in the stack. A typical stack may comprise only a few or many tens or even hundreds of cells. The present invention is relevant to all of these various fuel cell stack constructions.

Conventionally, power is extracted from the fuel cell stack using a pair of current collector plates, one of which is disposed against the outermost anode flow plate at one end of the stack and the other of which is disposed against the outermost cathode flow plate at the other end of the stack. A collector plate may typically be formed as a rigid plate of high electrical conductivity metal such as copper or stainless steel. A tab or protruding portion of each collector plate extends laterally outward from the stack to enable electrical connectors to be connected thereto, for example by soldering or by friction-fit push-on connectors.

It is an object of the present invention to provide an improved form of collector plate suitable for use in fuel cell stacks.

According to one aspect, the present invention provides a fuel cell stack assembly comprising:
a plurality of cells in a stack configuration, each cell comprising a membrane-electrode assembly disposed between an anode flow plate and a cathode flow plate;
a current collector plate at each end of the stack; and
a compression assembly configured to maintain the stack under compression;
wherein at least one of the current collector plates comprises a printed circuit board having a first face disposed against a cathode flow plate or an anode flow plate of an outermost cell in the stack; and
wherein the first face includes an electrically conductive layer disposed on a substrate of the printed circuit board.

The first face of the printed circuit board may include at least one electronic component disposed thereon. The at least one electronic component may comprise a sensor. The sensor may comprise a thermistor or other temperature sensor. The sensor component may be positioned on the printed circuit board to be in alignment with a flow channel extending along an adjacent face of the cathode flow plate or the anode flow plate. The sensor component may be configured to protrude beyond the face of the printed circuit board into the volume of said flow channel. The printed circuit board may include a connector tab extending laterally outward from a face of the stack assembly, and the electrically conductive layer may extend onto the connector tab. The printed circuit board may include at least one electrically conductive track extending from the electronic component to a connector tab extending laterally outward from a face of the stack assembly, the connector tab providing an electrical terminal for electrical connection to the electronic component. The printed circuit board substrate may be formed of an electrically insulating dielectric material. The current collector plates at each end of the stack may each comprise a printed circuit board having a first face disposed against a respective anode or cathode flow plate of an outermost cell in the stack. The electrically conductive layer on the first face of the printed circuit board may be configured to function as a stack current collector electrode. The fuel cell stack assembly may include an electrically conductive track on a second face of the printed circuit board opposite to the first face, the electrically conductive track configured to function as an electrical connection to one or more electronic components mounted to the first face of the printed circuit board. At least one of the current collector plates may extend laterally beyond a face of the stack assembly defined by the plurality of cells in the stack configuration to define a laterally extending portion, and may further include at least one electronic component mounted on the laterally extending portion. In another aspect, the invention provides a method of fabricating a fuel cell stack assembly with the above features.

Embodiments of the present invention will now be described by way of example and with reference to the accompanying drawings in which.

Figure 1:
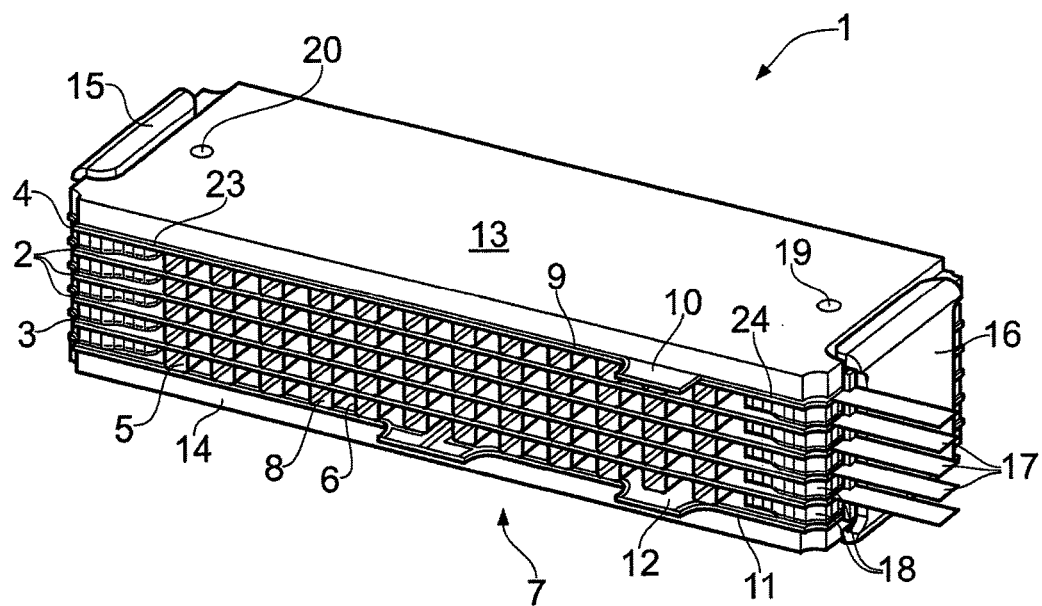
FIG. 1 shows a perspective view of a fuel cell stack.

Throughout the present specification, the descriptors relating to relative orientation and position, such as "top", "bottom", "horizontal", "vertical", "left", "right", "up", "down", "front", "back", as well as any adjective and adverb derivatives thereof, are used in the sense of the orientation of a fuel cell stack assembly as presented in the drawings, to assist in comprehension of the embodiments described. However, such descriptors are not intended to be in any way limiting to an intended use of the fuel cell stack assembly.

With reference to FIG. 1, fuel cell stack assembly 1 has a plurality of parallel cells 2 each including a membrane-electrode assembly (MEA) 3 disposed between an anode flow plate 4 and a cathode flow plate 5. In the stack assembly shown in FIG. 1, the anode flow plates 4 lie horizontally above each respective MEA 3 and the cathode flow plates 5 lie horizontally below each respective MEA 3.

The fuel cell stack shown is of the air-cooled, open cathode variety in which the anode flow plates 4 are thin metal layers each having a set of flow channels etched or otherwise formed in the surface (not visible in FIG. 1) of the anode flow plate that faces the MEA, to deliver anode fuel gas such as hydrogen to the anode side of the MEA 3. A layer of porous gas diffusion material (not visible in FIG. 1) may be positioned between the MEA and the anode flow plate to assist in distributing the fuel to the MEA surface. A gasket extends around the periphery of the MEA and the anode flow plate to provide a seal to prevent escape of anode fuel.

In the example shown, the cathode flow plate 5 is of the open cathode type and is formed as a corrugated plate 6. The corrugations provide open-ended flow channels 8 for the passage of air past the surface of the MEA or gas diffusion layer disposed thereon. The front face 7 of the stack 1 as viewed in FIG. 1 provides an air inlet face by which air can be passed in the stack volume to the cathode surfaces of the MEA. The opposite face of the stack (i.e. the reverse of the stack as viewed in FIG. 1) may provide a further air inlet face. Alternatively, if the stack is force ventilated, the opposite face may be an air outlet face for egress of air that was forced into the front face 7.

At the top of the stack assembly 1, an anode current collector plate 9 includes an anode current collector tab 10 extending laterally outwardly from the stack to provide an electrical terminal to which can be attached an electrical connector. At the bottom of the stack assembly 1, a cathode current collector plate 11 includes a cathode current collector tab 12 extending laterally outwardly from the stack to provide an electrical terminal to which can be attached an electrical connector, e.g. by soldering.

The stack assembly 1 is placed under compression by way of a pair of end plates, specifically a top end plate 13 and a bottom end plate 14, which are held together by left and right end clips 15 and 16. The end clips 15, 16 are applied in tension such that the layers of the stack are held tightly compressed in order that all gaskets correctly seal against the various layers of the cells in the stack.

The stack assembly 1 may also include a series of voltage monitoring tabs 17 each extending laterally outward from respective ones of the anode flow plates or cathode flow plates. In the example shown, the voltage monitoring tabs 17 are lateral extensions of the anode flow plates. Voltage monitoring tabs may be provided for every cell in the stack or may be provided every few cells in the stack, and are useful for monitoring cell voltages throughout the stack during operation.

Gasket arrangements 18 may provide sealing of the ends of the cells in the stack and may also provide vertically extending galleries through the stack for delivery and distribution of fuel to each cell in the stack. A port 19, 20 may be provided in each end of the top plate 13 to provide access to the distribution galleries which can be seen in FIG. 2. The gaskets may generally be of any form suitable for the particular configuration of cells and stack deployed.

Figure 2:
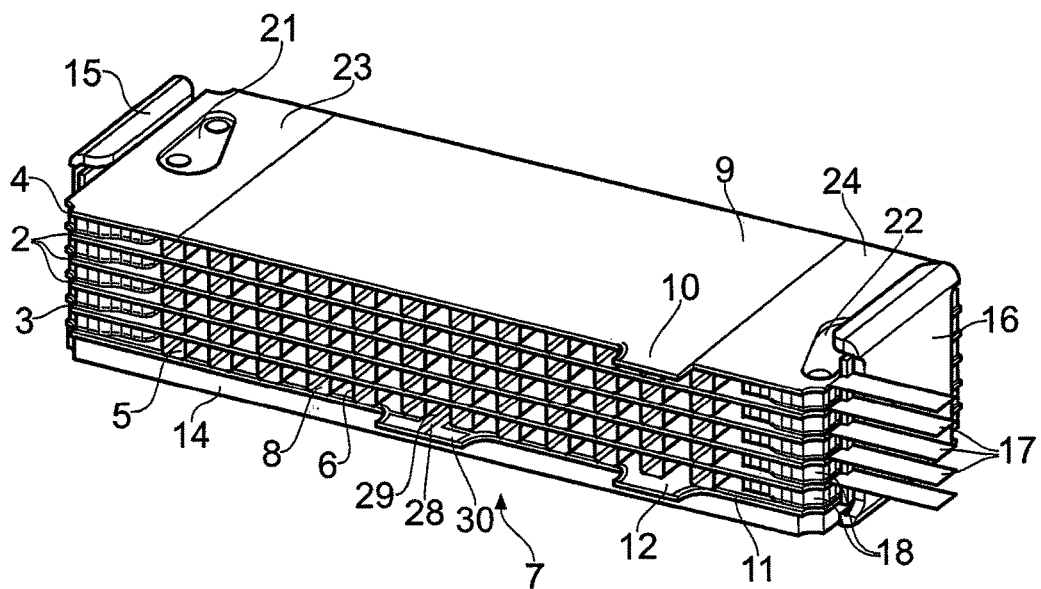
FIG. 2 shows a perspective view of the fuel cell stack of FIG. 1 with a compression end plate removed to reveal internal components.

FIG. 2 shows the fuel cell stack assembly 1 with the top end plate 13 removed to reveal the anode current collector plate 9, anode fluid distribution galleries 21, 22 which are accessed through the ports 19 and 20. Spacer plates or gasket layers 23, 24 may be provided of similar thickness to the anode current collector plate 9 if the anode current collector plate 9 does not extend to the left and right sides of the stack, as will be discussed later. The thickness of such gasket layers 23, 24 may generally be of any suitable thickness when uncompressed such they function correctly to provide sealing and spacing functionality when compressed appropriately for the assembled stack.

Figure 3:
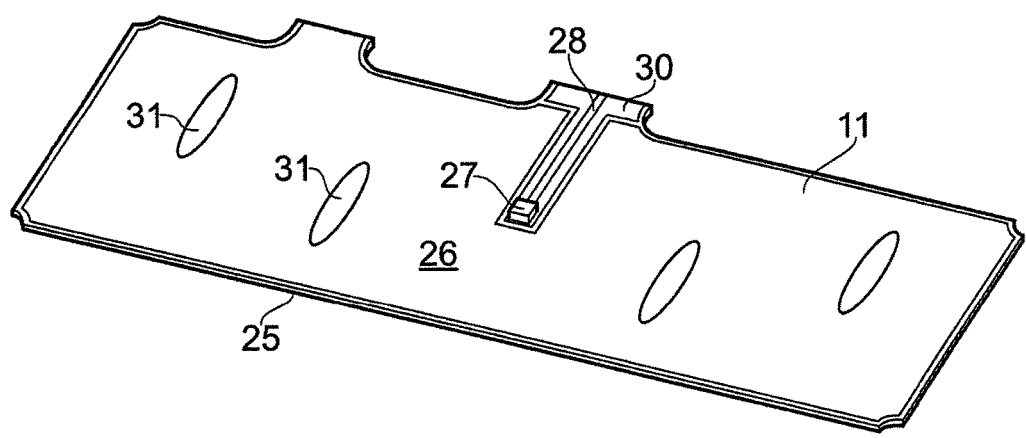
FIG. 3 shows a perspective view of a current collector plate of the stack of FIGS. 1 and 2.

Referring now to FIG. 3, the cathode current collector plate 11 is shown removed from the stack assembly 1 and rotated back to front compared to the orientation of FIGS. 1 and 2. Cathode current collector plate 11 is fabricated from a printed circuit board substrate 25 of suitable electrically insulating dielectric material such as epoxy resin with a woven or non-woven support in a laminated structure. Disposed on the substrate 25 is a layer of highly electrically conductive material 26 such as copper which is patterned to extend over most of the substrate. This layer of material 26 serves as a current collection electrode for the fuel cell stack. More generally, the layer of highly electrically conductive material 26 may be configured to extend over any sufficient area of the substrate 25 for the current collector plate 11 to provide adequate current collection from the adjacent cell. The layer of electrically conductive material 26 may be partially or wholly formed from a conductive inlay fabric or other material which may be rubberised or generally flexible to provide a degree of flexibility and compressibility.

At a selected position, or plural selected positions, on the surface of the printed circuit board substrate 25 is mounted one or more electrical components 27 to which electrically conductive tracks 28 are made for electrical connection. The main field area of electrically conductive material 26 which serves as a stack current collection electrode can also be used as a second electrical connection for the electrical components 27, or multiple separate tracks 28 can be used instead. Multiple components 27 can be disposed over the surface of the printed circuit board 25/cathode current collector plate 11 and these can be aligned with flow channels in the adjacent flow plate 5 or anywhere else on the substrate 25. The conductive tracks 28 are preferably extended to the edge of the board 25 where they terminate at, or proximal to, the edge of the board, preferably on a laterally extending tab 30. A push-fit or clip-on electrical connector may be attached to the tab, or a solder joint made, during or after assembly of the stack.

Areas 31 may provide protection against thermal delamination, e.g. by providing discontinuities in the sheet or layer of electrically conductive material 26 patterned over the substrate. This can allow for differential thermal expansion rates of the layer of material 26 and the underlying substrate 25.

In a preferred arrangement, the electrical component 27 is a sensor, and in a yet further preferred arrangement, the sensor is a thermistor for monitoring temperature. Multiple sensors may be distributed across the area of the cathode current collector plate. In the preferred example shown, the thermistor is surface mounted and projects upwardly from the main surface of the printed circuit board 25 such that it projects partly into an air flow channel 29 (see FIG. 2) and therefore accurately monitors temperature of air flow through the cathode flow channel.

Other types of sensor may be mounted to the printed circuit board 25 in similar manner for sensing status of the fuel cell. Such sensors could include temperature sensors, humidity sensors, impurity sensors, etc. The printed circuit board substrate 25 could more generally extend laterally beyond a face (e.g. front face 7) of the stack assembly 1 defined by the cells 2 in the stack configuration, to define a laterally extending portion on which could be mounted electrical components 27 outside the main body of the stack (in addition to or instead of the laterally extending tab 30). For example, a thermistor may work effectively outside the main body adjacent to the main air flow path.

Electrical components 27 mounted to the printed circuit board 25 may be electrically connected via electrical tracks disposed on the reverse side of the board, i.e. the opposite side to that on which the cathode current collecting conductor 26 is disposed. This option may provide for a more extensive or unbroken area of conductor 26, while still allowing an electrical connection to be made to a laterally extending tab 30.

The cathode current collection tab 12 and the tab 30 for the sensor conductive tracks 28 could be combined in one tab. The sensor connections and the cathode current collection connections could be disposed on opposite faces of the tab.

In another arrangement, some or all of the laterally extending tabs could be dispensed with. A current collection connection could be provided on the main body of the collector plate 11 by providing a cut-out in the end plate 14 allowing access to a connector region of a face of the collector plate opposite to the face on which the conductive material 26 lies. Electrical connection through the printed circuit board substrate 25 can be made using conventional electrical vias or the like. Multiple such connections could be provided.

The main field area of electrically conductive material 26 serving as the stack current collection electrode on the printed circuit board 25 need not be continuous across the entire surface of the cathode current collector 11. In the exemplary arrangement of an open cathode fuel cell stack as shown, electrical conductivity of the printed circuit board is important in areas where the board 25 will be in physical contact with the corrugated plate 6 of the cathode. It is therefore possible to provide discrete tracks of electrically conductive material 26 that are each in alignment with a respective portion of the corrugated plate 6 that comes into contact with the printed circuit board. A common rail across the width of the stack could then electrically couple each of these discrete tracks for connection to the cathode current collection tab 12. This common rail could be provided on either face of the printed circuit board.

A possible advantage of providing electrically conductive tracks 26 only in the region of contact between the printed circuit board and the corrugated plate 6 is that metal tracks need not be formed over the flow channels. The metal tracks are thus less exposed to fluids flowing in the channels 29 and less susceptible to corrosion from such fluids. In another arrangement, selected portions of the electrically conductive material 26 could be coated with a protective layer.

Generally, however, the metal tracks on the printed circuit board that serve as a stack current collection electrode can be formed from any suitable electrically conductive material that can be printed or otherwise deposited on the substrate 25. Preferred metals include those which have highest electrical conductivity, but other materials may be used for reduced reactivity to any gas flows in the adjacent flow channels. Exemplary materials could include silver, gold or stainless steel layers or coatings.

The principle of using a printed circuit board as a current collector plate need not be used solely for the cathode current collector plate 11, but is also applicable to the anode current collector plate 9. The anode current collector plate 9 formed from a printed circuit board need not include sensors though it could do so. As shown, the printed circuit board collector plate 9 need not extend over the entire stack width but can be a partial layer bounded by the spacer plates 23, 24. The spacer plates may be gasket material but could also be fabricated from printed circuit board substrate material, but need not have electrically conductive tracks thereon. The printed circuit board substrate material may be chosen to have gasket-like sealing properties, e.g. a certain degree of compressibility and gas sealing capability, or may have gasket material bonded onto the substrate. The printed circuit board could be provided using a single layer board or multiple layer board.

The use of a printed circuit board current collector plate 9, 11 provides significant benefits in modularity and design changes. The patterns of electrical conductivity required of the current collector plate for any type of stack assembly can readily be altered using highly efficient and well-established PCB manufacturing techniques, and can be adapted for: different configurations of anode or cathode flow plates 4, 5; different sensor positions; and different external connections such as tabs or solder points. They are highly suited to volume manufacture and assembly and are highly cost effective. Standard PCB connector arrangements can be used and standard component mounting techniques can be used for reduced cost. Integrating sensors such as temperature sensors into the current collector plates means that component count and complexity of manufacture can be reduced.

The assembly described here is particularly suited to small-scale fuel cell stacks with few cells, such as those that can be used in consumer electronic devices. However, the principle can be applied to larger fuel cell stacks.

The printed circuit boards used as current collector plates need not be formed with rigid substrate material. Flexible boards are available and could be used where stack design permits or where some flexibility in the collector plates is required, e.g. to absorb uneven compressive forces applied by the top and bottom end plates 13, 14.

The printed circuit boards used as current collector plates can be used with a wide variety of types of fuel cell stack construction and need not be limited to the particular configurations of stack shown in the drawings and described in the illustrative embodiments. Other embodiments are intentionally within the scope of the accompanying claims.

The invention claimed is:

1. A fuel cell stack assembly comprising:
   a plurality of cells in a stack configuration, each cell comprising a membrane-electrode assembly disposed between an anode flow plate and a cathode flow plate, each cathode flow plate formed as a corrugated plate with a plurality of corrugations that each provide an open-ended flow channel exposed to a cathode surface of the membrane-electrode assembly and extending from a front face of the stack to a rear face of the stack assembly;
   a current collector plate at each end of the stack; and
   a compression assembly configured to maintain the stack under compression;
   wherein a first current collector plate comprises a printed circuit board having a first face disposed against a cathode flow plate of an outermost cell in the stack; and
   wherein the first face of the first current collector plate includes an electrically conductive layer disposed on a substrate of the printed circuit board;
   wherein the first face of the first current collector plate further includes at least one electronic component disposed on the first face of the first current collector plate;
   wherein the at least one electronic component comprises a sensor; and
   wherein the sensor is surface mounted and projects upwardly from the first face on the printed circuit board and projects partly into one of the open-ended flow channels provided by one of the plurality of corrugations of the cathode flow plate of an outermost cell in the stack.

2. The fuel cell stack assembly of claim 1 in which the sensor comprises a thermistor or other temperature sensor.

3. The fuel cell stack assembly of claim 1 in which the sensor comprises one of a humidity sensor or an impurity sensor.

4. The fuel cell stack assembly of claim 1 in which the printed circuit board includes a connector tab extending laterally outward from a face of the stack assembly, and in which the electrically conductive layer extends onto the connector tab.

5. The fuel cell stack assembly of claim 1 in which the printed circuit board includes at least one electrically conductive track extending from the electronic component to a connector tab extending laterally outward from a face of the stack assembly, the connector tab providing an electrical terminal for electrical connection to the electronic component.

6. The fuel cell stack assembly of claim 1 in which the printed circuit board substrate is formed of an electrically insulating dielectric material.

7. The fuel cell stack assembly of claim 1 in which the current collector plate at the end of the stack opposite the first current collector plate comprises a second current collector plate comprising a printed circuit board having a first face disposed against an anode flow plate of an outermost cell in the stack.

8. The fuel cell stack assembly of claim 1 in which the electrically conductive layer on the first face of the printed circuit board is configured to function as a stack current collector electrode.

9. The fuel cell stack assembly of claim 8 further including an electrically conductive track on a second face of the printed circuit board opposite to the first face, the electrically conductive track configured to function as an electrical connection to one or more electronic components mounted to the first face of the printed circuit board.

10. The fuel cell stack assembly of claim 7 in which at least one of the first or second current collector plates extends laterally beyond the front face or the rear face of the stack assembly to define a laterally extending portion, and further including at least one electronic component mounted on the laterally extending portion.

11. The fuel cell stack assembly of claim 1 in which the electrically conductive layer is not continuous across the entire surface of the first face of the first current collector plate.

12. The fuel cell stack assembly of claim 11 in which the electrically conductive layer is provided in a plurality of discrete tracks that are each in alignment with a respective corrugation of the cathode flow plate of an outermost cell in the stack, with the plurality of discrete tracks electrically coupled by a common rail across the width of the first current collector plate.

13. The fuel cell stack assembly of claim 1 in which at least a portion of the electrically conductive layer is coated with a protective layer.

14. The fuel cell stack assembly of claim 7 in which the second current collector plate does not extend across the full width of the anode flow plate of an outermost cell in the stack against which the first face of the printed circuit board of the second current collector plate is disposed.

* * * * *